(12) United States Patent
Kawalkar

(10) Patent No.: US 9,205,931 B1
(45) Date of Patent: Dec. 8, 2015

(54) SYSTEM AND METHOD FOR INCREASING PILOT AWARENESS DURING NON-NORMAL FLIGHT SITUATIONS

(71) Applicant: HONEYWELL INTERNATIONAL INC., Morristown, NJ (US)

(72) Inventor: Amit Nishikant Kawalkar, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/333,188

(22) Filed: Jul. 16, 2014

(51) Int. Cl.
*G08B 23/00* (2006.01)
*B64D 45/00* (2006.01)

(52) U.S. Cl.
CPC ..................... *B64D 45/00* (2013.01)

(58) Field of Classification Search
CPC ....... H04B 7/18508; G08G 5/02; B64D 45/00
USPC .......... 340/963, 945, 969, 973, 978; 701/4, 9, 701/14
See application file for complete search history.

(56) References Cited

U.S. PATENT DOCUMENTS

| | | | |
|---|---|---|---|
| 5,339,244 A | | 8/1994 | Stiles, Jr. et al. |
| 5,722,620 A | * | 3/1998 | Najmabadi et al. ........... 244/181 |
| 6,332,105 B1 | | 12/2001 | Calise et al. |
| 6,385,513 B1 | * | 5/2002 | Murray et al. .................. 701/14 |
| 6,983,206 B2 | * | 1/2006 | Conner et al. ................ 701/301 |
| 7,636,618 B2 | | 12/2009 | Cordova et al. |
| 2002/0099478 A1 | * | 7/2002 | Ishihara et al. ................... 701/9 |
| 2013/0345910 A1 | | 12/2013 | Kerho et al. |

OTHER PUBLICATIONS

Shin, HH et al.; Design of a Flight Envelope Protection System Using a Dynamic Trim Algorithm, Technical Paper, Int'l Journal of Aeronautical & Space Science 12(3), 241-251 (2011).
Gingras, D.R. et al.; Envelope Protection for In-Flight Ice Contamination, 47th AIAA Aerospace Sciences Meeting including the New Horizons Forum and Aerospace Exposition Jan. 5-8, 2009, Orlando, Florida; AIAA 2009-1458.

* cited by examiner

*Primary Examiner* — Tai T Nguyen
(74) *Attorney, Agent, or Firm* — Ingrassia Fisher & Lorenz, P.C.

(57) ABSTRACT

A method and system for increasing pilot awareness in an aircraft during non-normal flight situations is provided. A non-normal flight situation is detected, and a critical flight parameter and its associated condition for monitoring based on the non-normal situation is determined. An envelope surrounding the aircraft is generated that is consistent with the non-normal situation, and the critical flight parameter is monitored based on the non-normal situation.

11 Claims, 10 Drawing Sheets

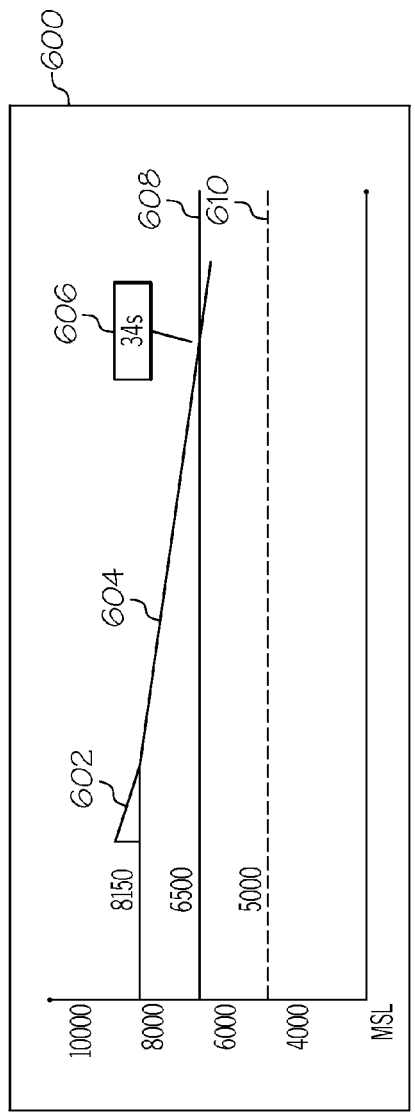
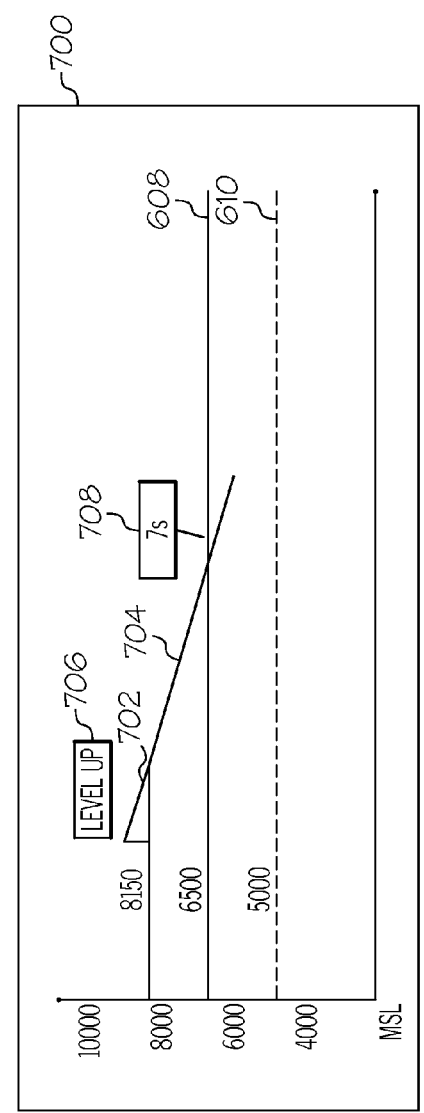

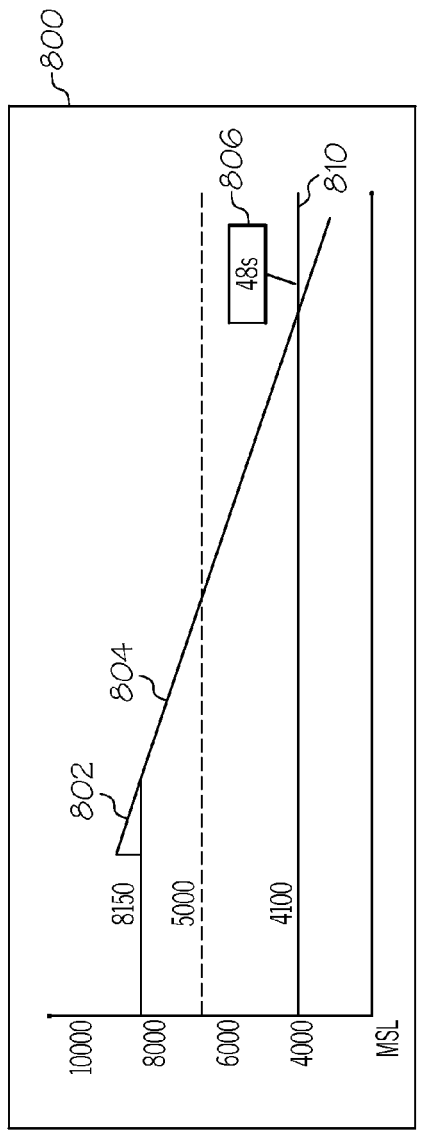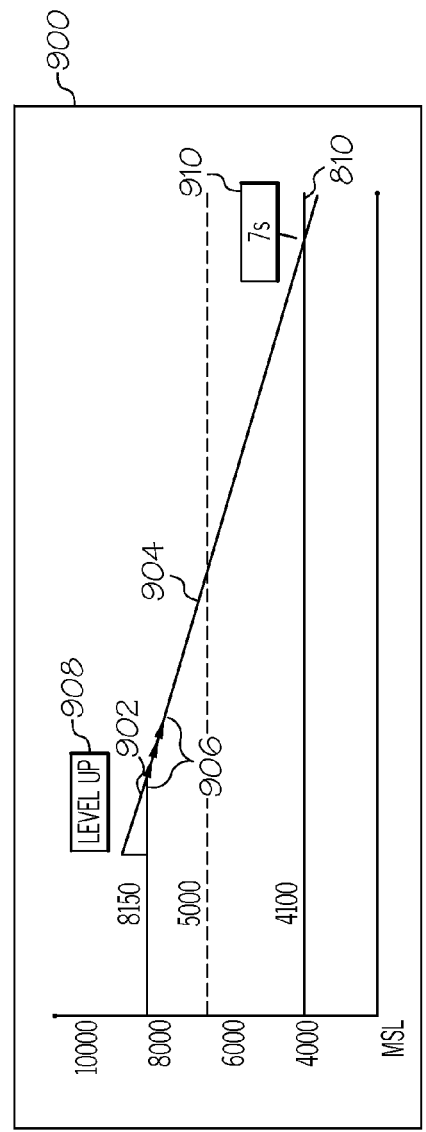
FIG. 8
FIG. 9

SYSTEM AND METHOD FOR INCREASING PILOT AWARENESS DURING NON-NORMAL FLIGHT SITUATIONS

TECHNICAL FIELD

Embodiments of the subject matter described herein relate generally to monitoring critical parameters during flight operations and, more particularly, to systems and methods for increasing pilot awareness during non-normal flight situations.

BACKGROUND

Pilot awareness; i.e. pilot situational awareness, is derived by continually monitoring aircraft critical parameters such as air traffic control (ATC) altitude restrictions, enhanced ground proximity warning system (EGPWS) floor altitudes, angle of attack, indicated air speed (IAS), vertical speed, and the like. A pilot relies on the status of various aircraft critical parameters to maintain spatial and aerodynamic safety. During normal flight situations, a majority of the monitoring activities may be offloaded to resources such as a flight management system (FMS) and automatic pilot (AP), thereby relieving the pilot of the monitoring duty and reducing pilot cognitive workload.

Non-normal flight situations impose manual monitoring duties on the pilot. Examples of non-normal flight situations include the unavailability of FMS and AP monitoring resources, severe weather, turbulence, and emergencies. Even when the FMS and AP are working properly, severe weather, turbulence, and emergency situations can adversely affect pilot situational awareness, distract the pilot from timely monitoring critical flight parameters, and raise the risk data entry errors.

Emergency situations require that the pilot additionally integrate emergency response tasks with monitoring activities and the derivation of pilot situational awareness. Since monitoring activities typically require a round robin manner of periodic and cognitively taxing parameter monitoring tasks, the pilot must switch focus frequently, thereby additionally taxing emergency response and overall safety. Emotionally arousing emergencies and events may even further tax cognitive bandwidth and human behavioral capacity for monitoring activities.

In summary, in the context of non-normal situations or prevailing emergencies, manual monitoring activities are highly challenging and increase safety concerns. Pilot training is only a partial solution because emotionally arousing non-normal situations may negatively affect cognitive bandwidth and human behavioral capacity for monitoring activities.

Consequently, a system and method for increasing pilot awareness in an aircraft during non-normal flight situations is desirable. The desired system and method generates an envelope of critical parameters surrounding the aircraft and alerts the crew when envelope boundaries are approached. The desired system and method intelligently unburdens the pilot of monitoring tasks, allowing the pilot to concentrate on the prevailing situation response and spend minimal cognitive and physical bandwidth on otherwise periodic and cognitively taxing monitoring tasks.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A method for increasing pilot awareness in an aircraft during non-normal flight situations is provided. A non-normal flight situation is detected, and a critical flight parameter and its associated condition for monitoring based on the non-normal situation are determined. An envelope surrounding the aircraft is generated that is consistent with the non-normal situation, and the critical flight parameter is monitored based on the non-normal situation.

Another method for increasing pilot awareness in an aircraft during non-normal flight situations is provided. A non-normal flight situation is identified, and a critical flight parameter and its associated condition for monitoring based on the non-normal situation are determined. An envelope boundary for the aircraft that is representative of the condition is created, and the critical flight parameter is monitored. Temporal information related to the aircraft, critical flight parameter and condition is graphically displayed.

A system for increasing pilot awareness in an aircraft during non-normal flight situations is also provided. The system includes a display, a situation recognizer for identifying a non-normal flight situation, and a monitoring engine. The monitoring engine is responsive to the situation recognizer and coupled to the display, and is configured to 1) receive a critical flight parameter and its associated condition in response to an identified non-normal flight situation, 2) monitor the critical flight parameter against the condition, and 3) generate symbology on the display that is graphically representative of the aircraft and the parameter.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

FIG. 6 is a vertical situation display (VSD) of a host aircraft illustrating intuitive visualization of a temporal buffer in accordance with an exemplary embodiment;

FIG. 7 is a VSD of a host aircraft illustrating a crew alert in response to the temporal buffer of FIG. 6 reaching an alert threshold;

FIG. 8 is a VSD of a host aircraft illustrating intuitive visualization of a temporal buffer in accordance with another exemplary embodiment;

FIG. 9 is a VSD of a host aircraft illustrating visual cues to indicate how fast the aircraft is approaching an alert threshold;

DETAILED DESCRIPTION

Figure 1:
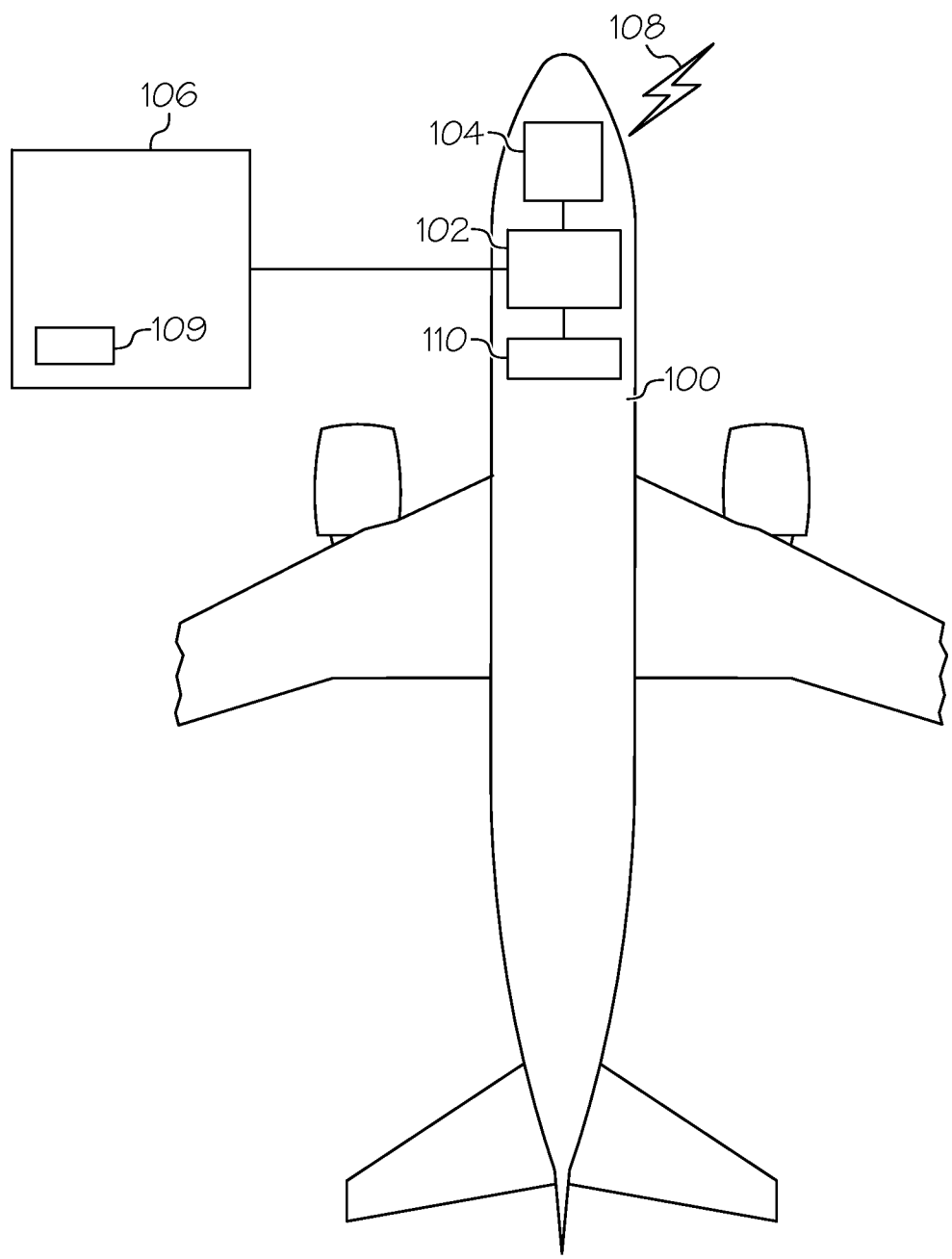
FIG. 1 is a simplified illustration of an aircraft having a non-normal situation module according to the exemplary embodiment.

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, conventional techniques related to graphics and image processing, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The embodiment described herein is merely an example and serves as a guide for implementing the novel systems and method herein on any user interface in any industrial, commercial, or consumer avionics application. As such, the examples presented herein are intended as non-limiting.

FIG. 1 is a simplified illustration of an aircraft 100 having a non-normal situation module 102 according to an exemplary embodiment. The non-normal situation module 102 is coupled to an aircraft display module 104 and to a ground station 106. The aircraft 100, and its subsystems and modules may also receive wireless communications 108 from, for example, aircraft communications addressing and reporting system (ACARS), satellite, and similar means of wireless communications. The non-normal situation module 200 obtains various aircraft and system data and generates intuitive visualizations and aural alerts and announcements that enhance situational awareness as described in more detail in connection with FIGS. 2 through 12.

Aircraft 100 includes a user interface 110 coupled to the non-normal situation module 102. The ground station 106 also includes a user interface 109. The user interfaces may include any combination of one or more of the following: a keypad, touchpad, keyboard, mouse, touchscreen, joystick, knob, microphone, speech or gesture recognition or another suitable device adapted to receive input from a user. Data, pilot preference parameters, software updates, and the like, may be entered via a user interface 109 at the ground station 106 or at a user interface 110 onboard the aircraft. Pilot preference parameters are described in more detail in connection with FIG. 2.

One or more display modules 104 may be coupled to or integrated into the non-normal situation module 102, for example, as part of the visualizer and crew alerting module 206, described in more detail in connection with FIG. 2. In response to commands supplied from the non-normal situation module 102, display module 104 selectively renders various intuitive textual, graphic, iconic data, two dimensional or three dimensional, still or moving image data, and thereby supplies visual feedback and alerts to the pilot. It will be appreciated that the display module may be implemented using any one of numerous known display devices suitable for rendering textual, graphic, and/or iconic information in a format viewable by the pilot. Non-limiting examples of such display devices include various multifunction displays (MFD), Near to Eye (NTE), projection displays, cathode ray tube (CRT) displays, and flat screen displays such as LCD (liquid crystal display) and TFT (thin film transistor) displays. The display module 104 may additionally be implemented as a screen mounted display, or any one of numerous known technologies. It is additionally noted that the display module 104 may be configured as any one of numerous types of aircraft flight deck displays. For example, it may be configured as a multi-function display, a horizontal situation indicator, a vertical situation indicator, or the like. In the depicted embodiment, however, at least one display module 104 is configured as a primary flight display (PFD).

Figure 2:
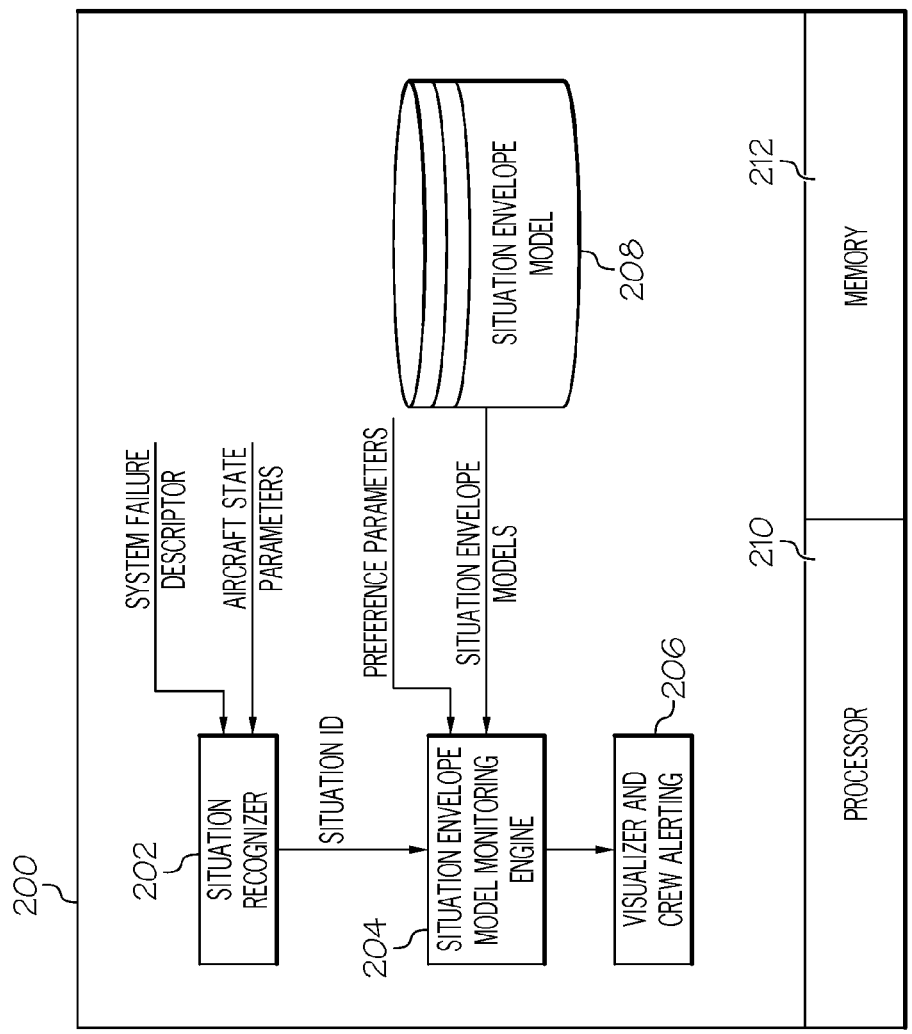
FIG. 2 is a system level block diagram of an exemplary embodiment of non-normal situation module suitable for use in an aircraft.

FIG. 2 is a system level block diagram of an exemplary embodiment of non-normal situation module 200 suitable for use in an aircraft. The non-normal situation module 200 includes situation recognizer 202, situation envelope model monitoring engine 204, and a visualizer and crew alerting module 206. One or more processors 210 and memory 212 are also included. In addition, each sub-module of the non-normal situation module may be implemented as one or more processors, as described in connection with FIG. 1. A situation envelope model database 208 provides situation envelope models to the situation envelope model monitoring engine 204.

The non-normal situation module 200 and its sub-modules may be implemented or realized with one or more processors 210 or using a cloud. Processor 210 may be a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

The non-normal situation module 200 and its sub-modules may also include or cooperate with an appropriate amount of memory 212, which can be realized as RAM memory, flash memory, EPROM memory, EEPROM memory, registers, a hard disk, a removable disk, a CD-ROM, or any other form of storage medium known in the art. In this regard, the memory can be coupled to the non-normal situation module 200 such that the non-normal situation module 200 can read information from, and write information to, the memory. In the alternative, the memory may be integral to the non-normal situation module 200. In practice, a functional or logical module/component of the system described here might be realized using program code that is maintained in the memory. Moreover, the memory can be used to store data utilized to support the operation of the module, as will become apparent from the following description.

The situation recognizer 202 may comprise a forward looking state machine that not only identifies prevailing situations but also predicts upcoming situations and failures. Situation recognizer 202 receives aircraft state parameters and system failure descriptors (from aircraft subsystems not shown) and generates a unique situation identification (ID) based, at least in part, on those inputs. Each non-normal situation, such as unavailability of FMS and AP monitoring resources, severe weather, turbulence, and various emergencies, is assigned a unique situation ID. The situation envelope model monitoring engine 204 receives a situation ID and pilot preference parameters; in response to the situation ID, the situation envelope model monitoring engine 204 obtains a corresponding situation envelope model.

Each situation envelope model may have one or more relevant parameters with one or more associated conditions. Situation envelope models are multi-parametric models of various known normal and non-normal situations that identify parameters to monitor and different conditions, levels or limits associated with the parameters, for monitoring the parameters against. Non-limiting examples of parameters within the situation envelope models include altitude, airspeed, vertical speed against air traffic control clearance altitudes and/or EPGWS floors, minimum reference velocity of aircraft under icing formation on the wings (Vref under icing), and the like. The situation envelope models are typically stored and retrieved from a database that may be periodically updated. However, pilot preference parameters, obtained via a user interface, may also be a source of parameters and conditions. Pilot preference parameters are typically provided by sources such as pilots, airlines, and outside equipment manufacturers (OEMs) in order to customize the set of parameters and conditions to monitor in given flight situations.

The situation envelope model monitoring engine 204 periodically monitors parameters with respect to a condition for each unique situation. For example, a parameter such as "altitude" may be monitored with respect to the condition "greater than air traffic control (ATC) level," or with respect to the condition "greater than enhanced ground proximity warning system (EGPWS) floor." Some parameters, such as "vertical speed," may be monitored with respect to multi-variant conditions, such as "less than OEM prescribed," where "OEM prescribed" further varies according to the unique situation. For each prevailing situation, the prescribed parameters are periodically monitored with respect to their prescribed condition.

The situation envelope model monitoring engine 204 synthesizes the various parameters and conditions into an envelope of relevant spatial and temporal boundaries that surround the aircraft. Consequently, as the periodically monitored parameters are obtained, the situation may be intuitively graphically displayed as an aircraft on a path surrounded by one or more boundaries of an envelope. The relationship between the aircraft and a boundary of an envelope may be measured and displayed as a time value (a temporal buffer, "Tb") or a distance value (spatial buffer, "Sb"). In this manner, the situation envelope model monitoring engine 204 derives the situation assessment. To further alert the pilot that the time remaining to reach a boundary (or distance to reach a boundary) has fallen below a predetermined value, an alert threshold of the predetermined value may be designated. When the alert threshold is reached, additional or distinct visual and aural alerts may be generated.

The situation assessment derived by situation envelope model monitoring engine 204 is used to generate appropriate commands to build intuitive pilot situation awareness visualizations within the visualizer and crew alerting module 206. The visualizer and crew alerting module 206 generates the associated visual and aural feedback on various displays (for example, within display module 104 of FIG. 1) and audio devices. Visual feedback may include two dimensional or three dimensional images using any combination of symbols, text, and moving images. Aural feedback may include warnings, directions, sounds or verbal instructions, such as a "level up" command that can be seen in FIGS. 7 and 9. As used herein. level up is an instruction to the pilot to adjust the aircraft so that it is flying level, not increasing or decreasing in altitude. Audio devices may be one or more devices suitable for announcing aural information. Example audio devices include radios, intercoms, sirens and horns. Visualization and aural feedback schemes can be configured for each type of situation in advance, or may be modified while the aircraft is in service to adapt to airlines or pilot preferences.

Figure 3:
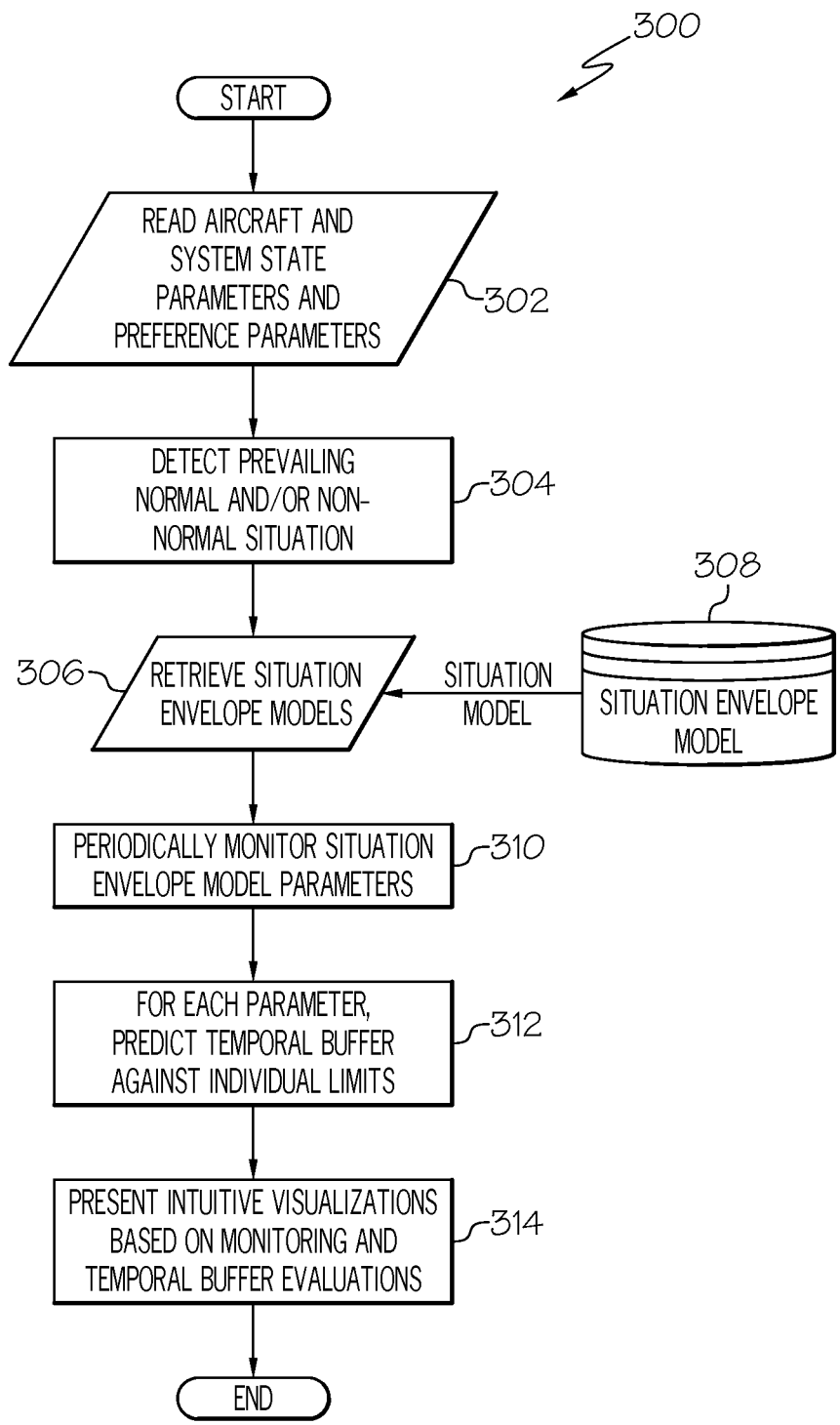
FIG. 3 is a flow chart describing steps of a non-normal situation module process in accordance with an exemplary embodiment.

FIG. 3 is a flow chart describing steps of a non-normal situation module process 300 in accordance with an exemplary embodiment. At STEP 302, aircraft state parameters, system state parameters and pilot preference parameters are received and read by the non-normal situation module 200. The prevailing normal or non-normal situation is detected at STEP 304. At STEP 306, the relevant situation envelope model is retrieved from the situation envelope model database 208. As described above, the multi-parametric models include parameters and conditions; the model parameters are periodically monitored with respect to their conditions in STEP 310.

In connection with measuring a parameter against its condition, a temporal buffer is predicted in STEP 312. The temporal buffer is typically the number of seconds required for the aircraft to reach the boundary of the prescribed envelope. In some embodiments, a spatial buffer, such as a "lateral distance remaining to bust" an ATC level or EGPWS floor is also predicted. Spatial and temporal buffers are intuitively displayed and/or announced at STEP 314, increasing the pilot's situational awareness, enabling the pilot to schedule tasks more effectively and saving the pilot's "time on task" and cognitive workload corresponding to the regular/periodic instrument monitoring and inference derivation required during cognitively taxing non-normal situations.

Figure 4:
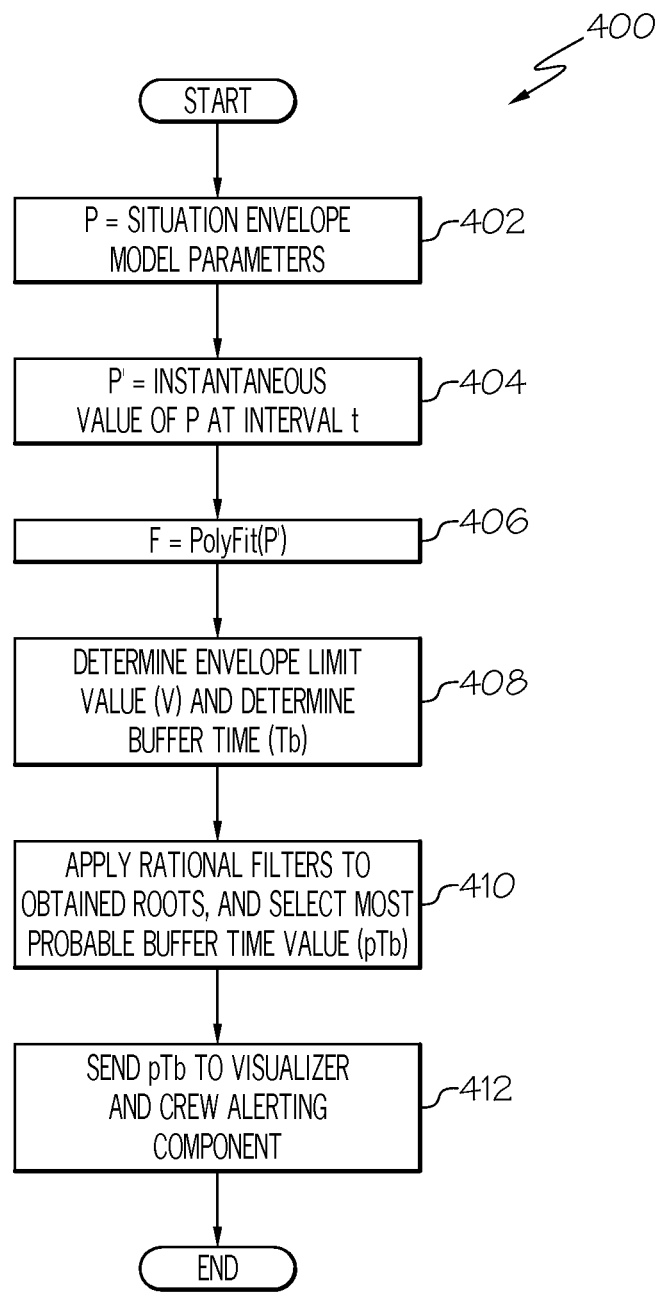
FIG. 4 is a flow chart describing a process for determining a temporal buffer in accordance with an exemplary embodiment.

FIG. 4 is a flow chart describing process 400 for determining a temporal buffer in accordance with an exemplary embodiment. As described above, for each situation a set of prescribed model parameters are monitored with respect to a condition. The algorithm 400 starts with the identification of a set of individual parameters associated with a given situation at STEP 402. The set of individual parameters is represented by the letter "P." At STEP 404, the instantaneous values of each of the parameters in the set P are sampled at regular intervals and their corresponding vectors are populated progressively. The Instantaneous values of the variables in set P are represented by "P prime," denoted P'. In STEP 406, P' for each parameter is curve fitted using an appropriate polynomial function, generating a set of fitted polynomial functions, denoted "F." In STEP 408, envelope limit (also referred to as the envelope boundary) values, "V," are determined according to F. Using available polynomial functions, one or more roots of F are determined, each root represents a predicted temporal buffer and is designated "Tb".

In STEP 410, rational filters are applied to the roots, Tb, to select a probable temporal buffer (pTb) that represents the time at which the value of the function F would be equal to the envelope boundary value V. In STEP 412, the probable temporal buffer pTb is sent to the visualizer and crew alerting module 206.

Figure 5:
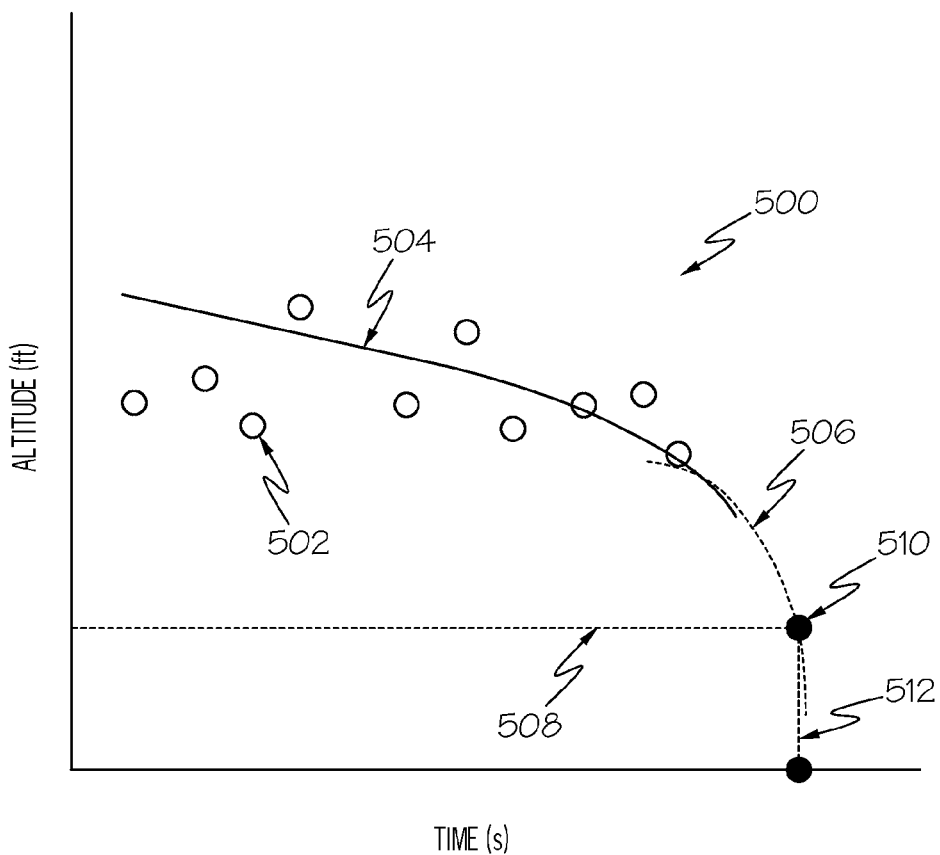
FIG. 5 is a graph of a curve fitting method for prediction of a temporal buffer according to the exemplary embodiment.

FIG. 5 is a graph of a polynomial curve fitting method for prediction of a probable temporal buffer according to the exemplary embodiment. Altitude is represented on the vertical axis and time is represented on the horizontal axis. Altitude sample 502 represents one of a plurality of altitude samples taken at a predetermined sample rate, such as every 500 ms. A quadratic curve 504 is generated using the altitude samples, and extrapolated (506) to reach ATC level altitude 508. Intersection 510 denotes where curve 504 is predicted to intersect with ATC level altitude 508. Extending intersection 510 to the time axis yields a probable temporal buffer pTb 512.

FIG. 6 is a vertical situation display (VSD) 600 of a host aircraft illustrating the intuitive visualization of a temporal buffer 606 in accordance with an exemplary embodiment. An aircraft 602 is shown on a predicted path 604, which is intuitively displayed on the VSD in a visually distinguishable manner with respect to the ATC clearance altitude 608 and the MCP set altitude 610 (as used herein, MPC set altitude refers to the target altitude set on the mode control panel for the AP to maintain). In this exemplary embodiment, the predicted temporal buffer 606 represents a predicted time remaining to reach the boundary of the ATC level. In this embodiment, the boundary of the ATC level may be one of the boundaries of a situation envelope model that has been selected to match a situation ID as described in connection with FIG. 2 and FIG. 3.

FIG. 7 is a VSD 700 of a host aircraft illustrating an alert in response to the temporal buffer reaching an alert threshold. An aircraft 702 is shown on a predicted path 704, which is intuitively displayed on the VSD in a visually distinguishable manner with respect to the ATC clearance altitude 608 and MCP set altitude. In this exemplary embodiment, the predicted time remaining 708 represents that a threshold or minimum time remaining has been exceeded. A visual crew alert 706 provides clear instruction to level up the aircraft. The crew alert 706 may be accompanied by an aural announcement of instructions, such as, level up. At this time, the pilot is expected to switch his or her current task and address the alert or level up command. As described, the boundary of the ATC level may be one of the boundaries of a situation envelope model that has been selected to match a situation ID as described in connection with FIG. 2 and FIG. 3.

FIG. 8 is a VSD 800 of a host aircraft illustrating intuitive visualization of a temporal buffer 806 in accordance with another exemplary embodiment. An aircraft 802 is shown on a predicted path 804, which is intuitively displayed on the VSD in a visually distinguishable manner with respect to the EGPWS floor value 810. In this exemplary embodiment, the predicted temporal buffer 806 represents a predicted time remaining to reach the floor value of the EGPWS. As described, the EGPWS floor value 810 may be one of the boundaries of a situation envelope model that has been selected to match a situation ID as described in connection with FIG. 2 and FIG. 3.

FIG. 9 is a VSD of a host aircraft illustrating visual cues to indicate how fast the aircraft is approaching an alert threshold. An aircraft 902 is shown on a predicted path 904, which is intuitively displayed on the VSD in a visually distinguishable manner with respect to the EGPWS floor value 810. In this exemplary embodiment, the predicted time remaining 910 represents that a threshold or minimum time remaining to reach the EGPWS floor has been exceeded. A visual textual crew alert 908 added to the VSD provides clear instruction to level up the aircraft. The crew alert 908 may be accompanied by an aural sound and/or aural announcement, such as, level up. At this time, the pilot is expected to switch his or her current task and address the alert or level up command.

In addition to the intuitive visualization schemes introduced herein, visual cues may be provided to indicate how fast the aircraft is approaching the alert threshold. Visual cues may be shapes such as chevrons or triangles, or may be graphical display color manipulation or flashing lines or text. In this embodiment, the more chevrons displayed 906 the faster the aircraft is approaching the boundary or limit that is being monitored. As described, the EGPWS floor value 810 may be one of the boundaries of a situation envelope model that has been selected as a result of a situation ID as described in connection with FIG. 2 and FIG. 3.

Figure 10:
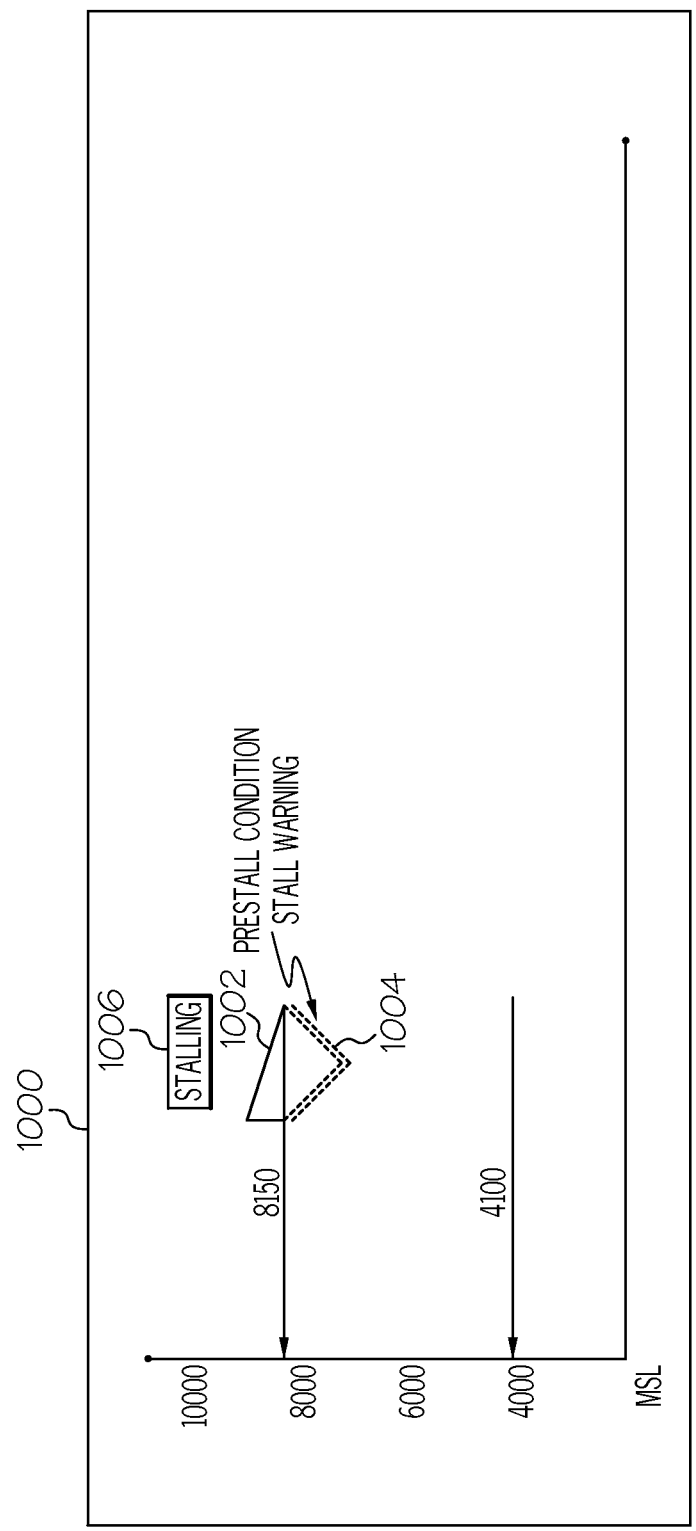
FIG. 10 is a VSD of a host aircraft illustrating intuitive visualization to predict a stall.

FIG. 10 is a VSD 1000 of a host aircraft illustrating intuitive visualization to predict a stall. An aircraft 1002 is shown with stall indicators. A visual, textual crew stall warning 1006 is displayed, as well as a visual graphical pre-stall condition and stall warning 1004. In the embodiment, the graphical pre-stall condition and stall warning 1004 is indicated with parallel v-shaped dotted lines, but other visually distinguishable graphical techniques may be employed. An aural stall alert or warning may also be announced. Stall warnings consider various parameters, such as altitude, vertical speed, IAS, and angle of attack.

Figure 11:
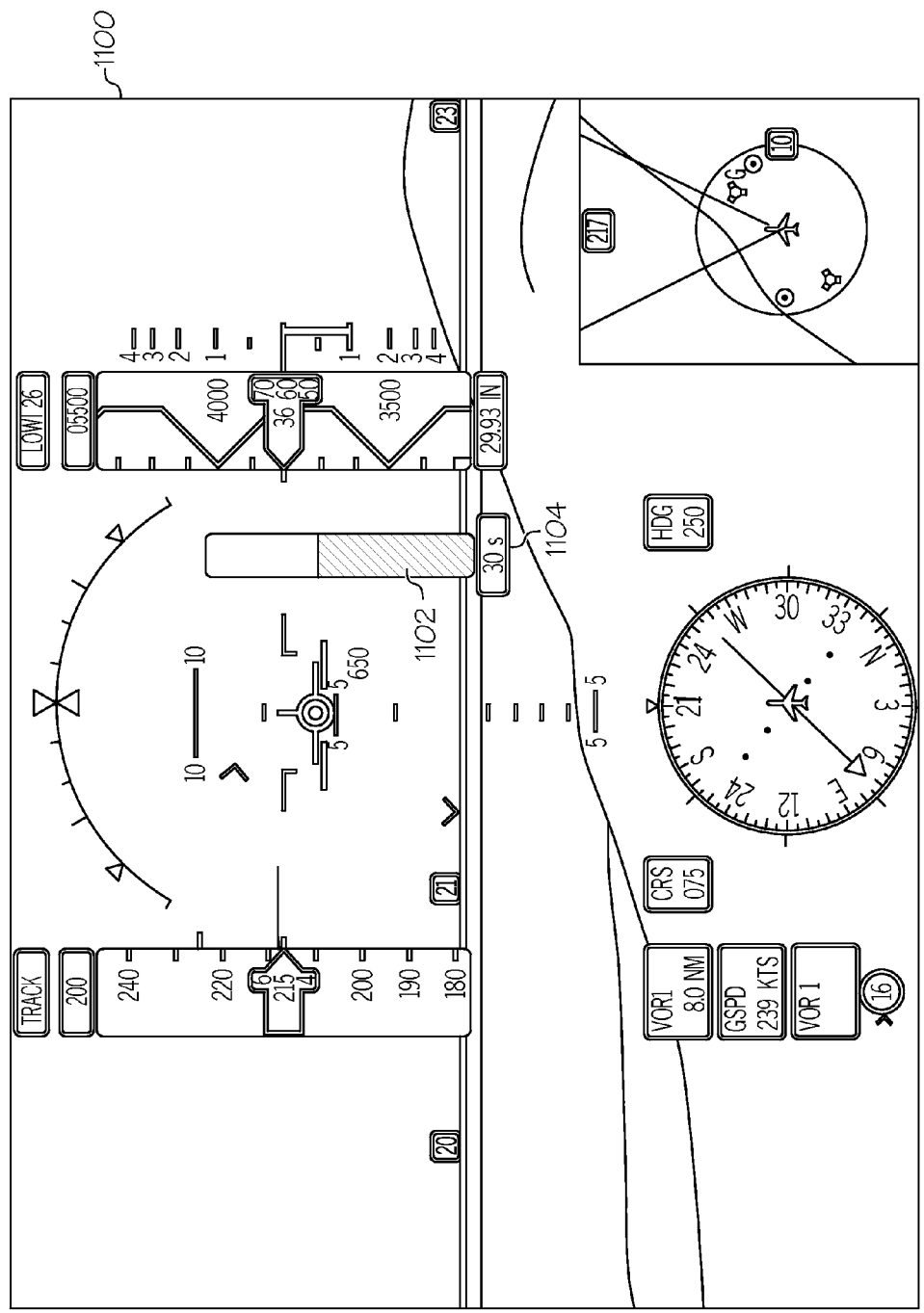
FIG. 11 is a cockpit display of a host aircraft illustrating a progress bar and time remaining to bust a limit in accordance with an exemplary embodiment.

FIG. 11 is a cockpit display 1100 of a host aircraft in accordance with an exemplary embodiment. Cockpit display 1100 includes an intuitive visualization of a progress bar 1102 and a display of seconds remaining 1104 (predicted time to reach the boundary).

Figure 12:
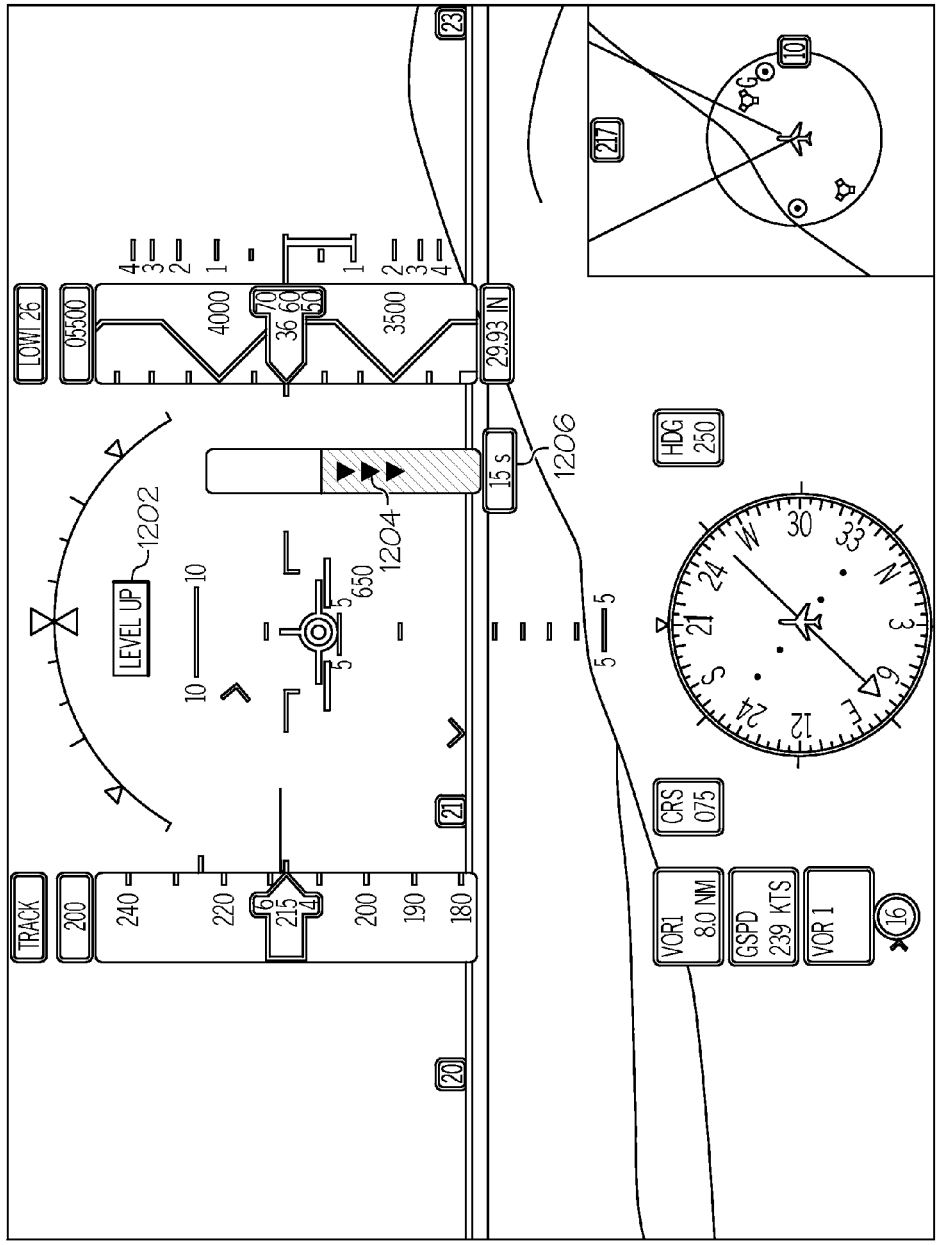
FIG. 12 is a cockpit display of a host aircraft illustrating visual alert and visual cues indicating aircraft speed as the aircraft approaches an envelope boundary.

FIG. 12 is a cockpit display 1200 of a host aircraft in accordance with an exemplary embodiment. Cockpit display 1200 includes additional intuitive visualizations to aid a pilot in derivation of situational awareness. Visual, textual, level up alert 1202 is shown, along with a progress bar 1204 that contains a plurality of chevrons displayed to indicate speed of approach to the boundary as described in connection with FIG. 9. The seconds remaining 1206 (predicted time to reach the boundary) is visually displayed by the progress bar 1204.

Non-normal situation module 102 continuously monitors the aircraft and system state parameters, pilot performance parameters, altitude, ground speed, wireless communications, and the like, as described herein. In response to the various inputs and models, the non-normal situation module 102 generates intuitive visualizations that may be integrated into the existing VSD or cockpit display and generates corresponding aural information that enhances pilot awareness.

Thus, there has been provided a method and system for increasing situational awareness in an aircraft during non-normal flight situations. The method intelligently unburdens the pilot of monitoring tasks, allowing the pilot to concentrate on the prevailing situation response and spend minimal cognitive and physical bandwidth on otherwise periodic and cognitively taxing monitoring tasks.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for increasing pilot awareness in an aircraft during flight situations, the method comprising:
    receiving aircraft state parameters and system failure descriptors from an aircraft subsystem;
    detecting a non-normal flight situation based upon the state parameters and the system failure descriptors;
    generating a situation identification based on the detected non-normal flight situation;
    retrieving a situation envelope model from a database and receiving pilot preference parameters entered by a pilot based on the situation identification;
    identifying a critical flight parameter, wherein the identified critical flight parameter comprises an associated condition;
    creating (i) a relevant spatial boundary or (ii) a relevant temporal boundary surrounding the aircraft based on the critical flight parameter and associated condition;
    determining a probable temporal buffer of time remaining until the aircraft reaches the relevant spatial or the relevant temporal boundary; and
    displaying intuitive visual graphics indicating the aircraft and probable temporal buffer on a cockpit display.

2. The method of claim 1, further comprising generating an alert when the probable temporal buffer is less than or equal to a predetermined alert threshold.

3. The method of claim 1, further comprising determining a spatial buffer substantially equal to a distance between the aircraft and a boundary of the envelope.

4. The method of claim 1, wherein generating an alert comprises displaying intuitive visual cues on a cockpit display.

5. The method of claim 4, further comprising indicating aircraft speed as the aircraft approaches a boundary of the envelope.

6. The method of claim 1, further comprising generating aural announcements.

7. The method of claim 1, further comprising receiving a pilot preference parameter and associated condition.

8. A system for increasing pilot awareness in an aircraft during non-normal flight situations, the system comprising:
    a situation recognizer is configured to detect a non-normal flight situation based upon receiving aircraft state parameters and system failure descriptors from an aircraft subsystem and thereby generating a situation identification based on the detected non-normal flight situation;
    a situation envelope model monitoring engine coupled to the situation recognizer and configured to (i) receive the situation identification, (ii) retrieve a situation envelope model from a database based on the situation identification, (iii) and receive pilot preference parameters entered by a pilot based on the situation identification, (iv) identify a critical flight parameter, wherein the identified critical flight parameter comprises an association condition, (v) create a relevant spatial boundary or relevant temporal boundary surrounding the aircraft, and (vi) determining a probable temporal buffer of time remaining until the aircraft reaches the boundaries of the relevant spatial boundary or relevant temporal boundary; and
    a visualizer and crew alerting device coupled to the situation envelope model monitoring engine and configured to display intuitive visual graphics indicating the aircraft and probable temporal buffer during non-normal flight situations.

9. The system of claim 8, wherein the situation envelope model monitoring engine is further configured to generate an alert when the probable temporal buffer is less than a predetermined alert threshold.

10. The system of claim 8, wherein the situation envelope model monitoring engine is further configured to graphically display visual cues that indicate aircraft speed as aircraft approaches a boundary of an envelope.

11. The system of claim 8, further comprising an audio device, and wherein the situation envelope model monitoring engine is further configured to command the audio device to announce aural information in response to the non-normal situation.

* * * * *